United States Patent
Albright et al.

[11] Patent Number: 6,056,254
[45] Date of Patent: May 2, 2000

[54] COLUMN CLAMP

[75] Inventors: Kenneth Bradley Albright, Weston; David Fredrick Didur, Toronto, both of Canada

[73] Assignee: Royal Laser Tech Corporation, Brampton

[21] Appl. No.: 09/166,469

[22] Filed: Oct. 5, 1998

[51] Int. Cl.[7] .............................. F16B 1/00; E04G 3/00; G09F 7/18
[52] U.S. Cl. .......................... 248/230.1; 223/120
[58] Field of Search .................... 248/230.1–230.9, 248/226.11, 177.1, 19.2, 188.1, 540, 541, 219.4; 403/1; 223/120

[56] References Cited

U.S. PATENT DOCUMENTS

| | | | |
|---|---|---|---|
| 1,547,065 | 7/1925 | Noble | 248/229.13 |
| 2,309,333 | 1/1943 | Bahr | 248/230.1 |
| 2,529,173 | 11/1950 | Moyer et al. | 248/230.1 |
| 3,167,292 | 1/1965 | Meyerowitz | 248/230.1 |
| 3,652,047 | 3/1972 | Starr | 248/230 |
| 5,409,150 | 4/1995 | Tranquilli | 223/68 |

*Primary Examiner*—Anita M. King
*Assistant Examiner*—Michael Nornberg
*Attorney, Agent, or Firm*—Ohlandt, Greeley, Ruggiero & Perle, L.L.P.

[57] ABSTRACT

A column clamp device for a display or mannequin on a cylindrical column and having a flange, a tubular body open at its upper and lower ends, a housing defined by the body, a clamping shoe moveably located within the housing, a clamp receiving member formed on the shoe, a screw receiving threaded member mounted in the wall and a clamping screw received within the threaded member for clamping the shoe.

8 Claims, 3 Drawing Sheets

COLUMN CLAMP

FIELD OF THE INVENTION

The invention relates to a column clamp for securing display mannequins, such as are used as in-store display or in-store windows for displaying clothing articles for sale, and in particular to having an adjustable height clamp, by means of which the height of the mannequin may be adjusted upwardly or downwardly on a support column with a minimum of effort and without the use of special tools.

BACKGROUND OF THE INVENTION

Display mannequins usually consist of a simulated body, which in many cases simply consists of a torso, but which may also have a head, and limbs, and which is provided with some means for supporting the mannequin in an upright position so as to display clothing for sale.

Clearly it is desirable that the mannequin shall be capable of being adjusted upwardly and downwardly in height. In the past, such mannequins have been supported on columns usually cylindrical tubular columns, secured to a base. The mannequin was secured by a form of clamping device, usually requiring a bolt or bolts to be tightened up by means of wrench, as being the simplest expedient for the purpose.

However, the use of a bolt or bolts to clamp on to a column inevitably results in deformation of the column and damage to the outside surface. In addition, the operation of the wrench may be inconvenient or even difficult for persons arranging such a display, and even persons who are experienced in using hand tools may occasionally damage the head of the bolt. For all of these reasons, it is desirable to provide a clamping device which can be attached to the mannequin, or other in-store display, and which can be slid onto a column. Clamping is preferably achieved by means of a hand operated wing nut, and some form of clamping shoe is preferably provided for clamping against the surface of the column so as to avoid scratching or damaging its surface.

BRIEF SUMMARY OF THE INVENTION

With a view therefore to providing at least some of the foregoing advantages, the invention comprises column clamp device for a display such as a mannequin, for mounting a mannequin on a cylindrical column, said display or mannequin having a base, and opening means in said base for receiving a portion of said column, said clamp device comprising a generally planar flange portion attachable to said base of said mannequin, around said opening, a generally tubular body extending downwardly from said flange portion, and open at its upper and lower ends, said body portion defining a semi-cylindrical column contact surface, on one side thereof, and opposed thereto an enlarged generally semi-cylindrical recess housing. Within the recess there is moveably located a generally semi-cylindrical clamping shoe, having concave and convex sides having a clamp receiving member on the convex side thereof, and formed with the enlarged semi-cylindrical recess housing, there is a generally rectangular box like wall holding a screw receiving threaded member, and a clamping screw is received within the threaded member, and passes through the interior of the rectangular wall, and is received in the clamp receiving member on the shoe.

Preferably, in one form of the invention, the structure is made of thermo-plastic, with the exception of a base in the clamp receiving member, and the threaded nut and the threaded clamping screw, which are formed of metal.

In a preferred form of construction, the shoe is formed at one end with a pair of inwardly flexing fingers, which hold the shoe within the semi-cylindrical recess housing, and permit movement of the shoe towards and away from the semi-cylindrical contact surface, and at the same time permit easy assembly.

For ease of operation, by movement up and down a post or column, the shoe is preferably provided with bevelled surfaces at each end of the concave side, so as to permit easy sliding on the column or post supporting the mannequin.

A semi annular flange is formed around the lower end of the semi-cylindrical recess housing to retain the shoe in position.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figures 1, 2:
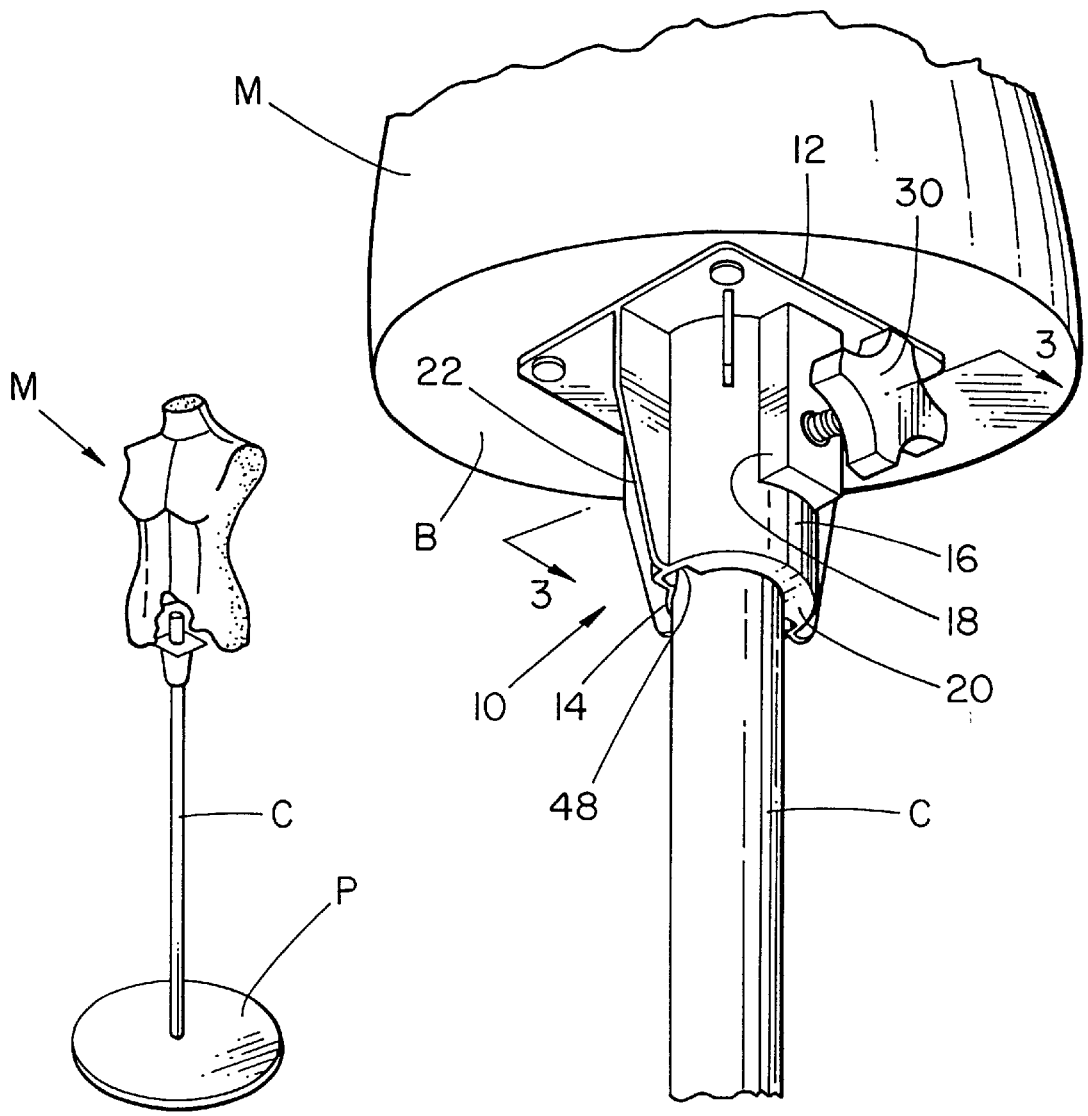
FIG. 1 is a schematic perspective illustration showing a display, in this case a typical mannequin torso, mounted on a column having a disc shaped base.
FIG. 2 is an enlarged lower perspective view of the underside of the mannequin and showing a clamping device illustrating the invention attached thereto.

Referring first of all to FIGS. 1 and 2, it will be seen that the invention is there illustrated for the purposes of explanation only, in use in association with a torso mannequin M, such as is typically used in a retail store window or in-store display. The torso M is mounted on a column C which in turn is mounted on a disc shaped plate P. The mannequin and column may of course be mounted in any one of a wide variety of different ways, and may be mounted as part of a multiple display of mannequins and other displays supported on a much larger plate or base, and the plate and column may be removably interengageable so that the column may be moved to other locations, or supported in other ways, all of which is well known in the art.

Also as is well known in the art it is desirable that mannequin M shall be capable of being moved up and down the column C, to accommodate for example clothing items, of different lengths, or of different types. Also it is desirable for the sake of simplicity in movement and shipping and storage the mannequin M may be entirely disassembled from the column C and the column C in turn removed from the plate, so that the entire apparatus can readily be moved and stored in a compact manner.

The mannequin M is formed with a generally planar base B (FIG. 2) in this embodiment. It is of course appreciated that the base B may be any particular desired shape and may be for example recessed upwardly into the mannequin or extending downwards or any other form of construction, the details of which are not relevant for the purposes of the explanation. The base B will be formed with a central opening to receive the upward extension of the column C, such opening being represented merely in phantom in FIG. 1.

The clamping device which is illustrated here for the purposes of describing the invention will seen to be represented by the general reference arrow 10. It comprises an upper flange 12 which in this case is shown as being a flat rectangular member which may be secured to the base B of the mannequin M by any suitable means such as bolts, screw fastenings or the like.

Extending downwardly from the flange 12 is a generally hollow body comprising a generally semi-cylindrical column contact surface 14, and opposed to such surface, a generally semi-cylindrical recess housing member 16. The radius of the semi-cylindrical contact surface 14 corresponds to the radius of the exterior of the column C so as to make a good secure contact. The radius of the generally semi-cylindrical housing portion 16 is greater than the radius of the contact surface 14, and is spaced outwardly from the column C. The semi-cylindrical housing portion 16 is further characterized by a generally rectangular box like body formation 18, extending downwardly from flange 12 for a portion of the length of the housing member 16.

At the lower end of the recess housing 16, there is an inwardly directed semi-annular flange 20.

Figure 3:
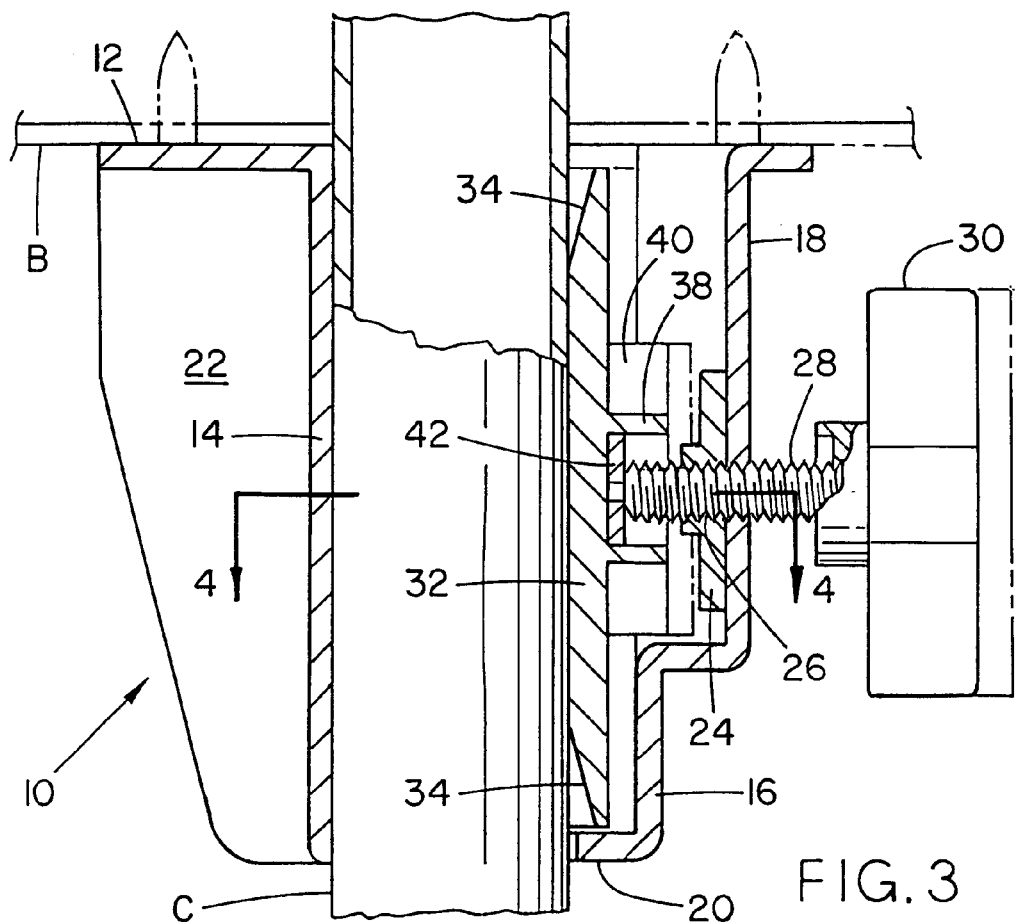
FIG. 3 is a section along the line 3—3 of FIG. 2.

Referring to FIGS. 2 and 3, in order to support the surface 14 and the recess housing portion 16 from flange 12, a plurality of generally radial support ribs 22 are formed at spaced intervals there around.

Secured within the generally rectangular box formation 18, is a generally rectangular metal nut 24 having a female threaded portion 26.

A clamping screw 28 is threadedly received in the female threads 26 and is operated by means for example of a large knurled hand wheel 30.

The rectangular plate 24 is secured in position in the box like formation 18, and is non-rotatable therein. Thus, rotation of screw 28 through threaded recess 26 in plate 24 will cause the screw 28 to enter into the interior of the housing portion 16.

Within the interior of the semi-cylindrical housing portion 16, there is located a moveable clamping shoe indicated generally as 32.

Figure 4:
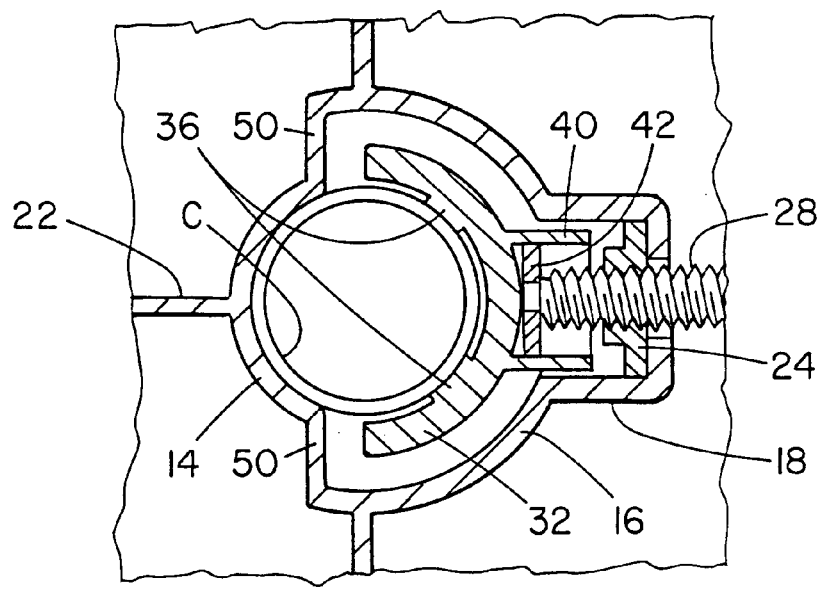
FIG. 4 is a section along the line 4—4 of FIG. 3.
Figure 5:
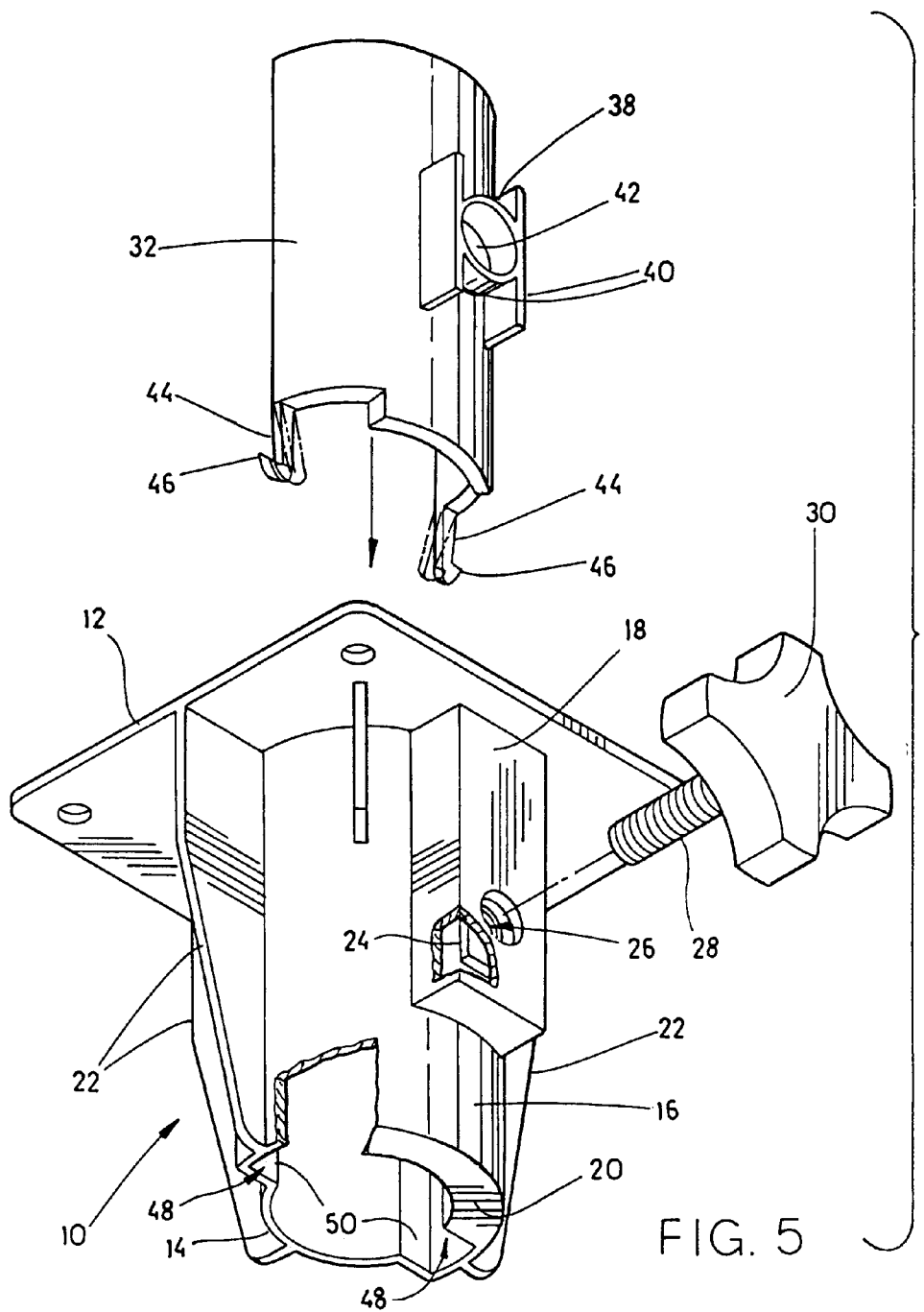
FIG. 5 is an exploded perspective illustration of the clamping device.

As shown in FIGS. 4 and 5, shoe 32 is of semi-cylindrical shape, having a radius substantially corresponding to the radius of the semi-cylindrical clamping surface 14, so that it engages the side or surface of the column C opposite to the surface 14.

Shoe 32 is formed with upper and lower angled lead surfaces 34. Within the concave interior of shoe 32 there are formed two or more ribs 36 (FIG. 4).

Formed on the convex outwardly facing surface of shoe 32, there is a clamp receiving member in the form of cup 38, supported by two parallel flanges 40. In the base of cup 38 there is located a screw receiving member in the form of a metal bearing plate 42, to receive the tip of clamping screw 28.

Thus, when clamping screw 28 is operated to clamp the shoe 32 against the column C and press it against the contact surface 14, the rotary grinding action of the tip of the screw 28 will be received on the metal plate 42 and will therefore not damage the thermo-plastic of which the rest of the clamp is constructed.

In order to facilitate assembly of the shoe 32 into the housing portion 16, and to retain the shoe 32 in position after it has been assembled, there are provided at the lower end of shoe 32 releasable shoe holders in the form of a pair of flexible fingers 44, having hook portions 46 formed thereon, the outer surfaces of which are angled or bevelled. Thus, when shoe 32 is pressed downwardly (FIG. 5) into the interior of semi-cylindrical housing portion 14, the fingers 44 will flex inwardly as shown in phantom, and when the hooks 46 emerge from the lower end of the semi-cylindrical housing portion 16, the fingers 44 will spring outwardly, and the hooks 46 will engage the lower end of the semi-cylindrical portion 16 thereby holding the shoe in housing portion 16 preventing the shoe 32 from becoming disassembled.

It will however be appreciated that there are opposed radial gaps 48, defined between the ends of semi annular flange 20, and the junction walls 50 joining the semi-cylindrical portion 16 to the clamping surface 14, and these two gaps 48 permit the hooks 46 to move, when the shoe 32 is clamped tightly against the surface of the column C.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A column clamp device for a display, for mounting such a display on a cylindrical column said display having a base and opening means in said base for receiving a portion of said column, said column clamp device comprising:

a flange portion attachable to said base of said display around said opening;

a generally tubular body portion extending downwardly from said flange portion, and open at its upper and lower ends;

a semi-cylindrical contact surface defined by said body portion, on one side thereof for contacting a side of said column;

an enlarged generally semi-cylindrical recess housing defined by said body portion opposite to said contact surface;

a generally semi-cylindrical clamping shoe moveably located within said recess housing, said shoe defining concave and convex sides;

releasable shoe holders integral with said clamping shoe, said holders being separate from said recess housing and holding said shoe within said semi-cylindrical recess housing, and permitting movement of said shoe towards and away from said semi-cylindrical contact surface;

a screw receiving member formed on said convex side of said shoe;

a generally rectangular wall formed integrally with said enlarged semi-cylindrical recess housing;

a screw receiving threaded member mounted in said rectangular wall; and, a clamping screw received within the threaded member and passing through the interior of said rectangular wall, and received in said screw receiving member on said shoe.

2. A column clamp device as claimed in claim 1, wherein said body portion and said shoe are formed of thermo-plastic material, and wherein said clamping screw and threaded member are formed of metal, and including a metallic base member located in said clamp receiving member, for supporting the free end of said clamping screw.

3. A column clamping device and claimed in claim 1, wherein said shoe is formed at one end with a pair of inwardly flexing fingers, said fingers holding said shoe within said semi-cylindrical recess housing, and permitting movement of said shoe towards and away from said semi-cylindrical contact surface.

4. A column clamping device as claimed in claim 1, wherein said shoe is formed with bevelled surfaces at each end of the concave side of said shoe, whereby to permit easy sliding of said shoe on said column.

5. A column clamping device as claimed in claim 1, further comprising a semi-annular flange formed around the lower end of the semi-cylindrical recess housing, to retain said shoe in position.

6. A column clamping device as claimed in claim 1, further comprising a torso mannequin forming said display, and wherein said column clamp is mounted on the underside of said mannequin, by securing said flange portion to said mannequin.

7. A column clamp device for mounting a display on a cylindrical column, said display having a base with an opening for receiving a portion of said column, the clamping device comprising:

- a flange portion attachable to said base around said opening;
- a generally tubular body portion extending downward from said flange portion;
- a contact surface, adapted to be secured to one side of said body portion, for contacting a side of said column;
- a generally semi-cylindrical recess housing defined by said body portion opposite to said contact surface; and
- a clamping shoe moveably located in said recess housing, said clamping shoe defining a pair of sides, said clamping shoe having a pair of inwardly flexing fingers for holding said clamping shoe in said recess housing and for permitting movement of said clamping shoe towards and away from said contact surface.

8. The column clamping device as claimed in claim 7, further comprising:

- a clamp receiving member being on one of said pair of sides of said clamping shoe;
- a generally rectangular wall being on said recess housing;
- a screw receiving threaded member being mounted in said rectangular wall; and,
- a clamping screw being received within the threaded member and passing through the interior of said rectangular wall, and being received in said clamp receiving member on said clamping shoe.

* * * * *